July 14, 1964 W. SCHMITT 3,141,055
OPEN HEARTH SMELTER SYSTEM
Filed Dec. 1, 1958 3 Sheets-Sheet 1

INVENTOR.
Wilhelm Schmitt
BY Michael S. Striker
ATTORNEY

July 14, 1964 W. SCHMITT 3,141,055

OPEN HEARTH SMELTER SYSTEM

Filed Dec. 1, 1958 3 Sheets-Sheet 2

INVENTOR.
Wilhelm Schmitt
BY
Michael S. Striker
Attorney

July 14, 1964  W. SCHMITT  3,141,055
OPEN HEARTH SMELTER SYSTEM
Filed Dec. 1, 1958  3 Sheets-Sheet 3

INVENTOR.
Wilhelm Schmitt
BY
Michael S. Striker
Attorney

United States Patent Office 3,141,055
Patented July 14, 1964

3,141,055
OPEN HEARTH SMELTER SYSTEM
Wilhelm Schmitt, 127 Altenbrucherdamm,
Duisburg-Grossenbaum, Germany
Filed Dec. 1, 1958, Ser. No. 777,368
10 Claims. (Cl. 266—33)

The present invention relates to an open hearth smelter and a method of operating the same. More particularly, the present invention relates to a device and method for the production of steel in open hearth regenerative furnaces.

Customarily, hot gaseous fuel and hot air are combined in the port portion of the hearth so as to form a long flame which will pass along the entire bath portion of the furnace. In a general way, satisfactory results are obtained with such conventional open hearth furnaces. However, it is necessary to build greater and greater units in order to obtain the desired increase in steel yield, and one problem so far unsolved was the early deterioration of the refractory inner walls of the open hearth furnace, resulting in frequent repairs and necessarily increased shut down time.

It is, therefore, on object of the present invention to overcome the disadvantages inherent in conventional open hearth furnaces and their operation.

It is a further object of the present invention to provide a structure and method which will reduce the required shut down periods and which will increase the yield from an open hearth furnace of given size.

It is yet another object of the present invention to provide an open hearth furnace and a method of operating the same which will greatly reduce the deterioration of the inner lining of the furnace walls.

Other objects and advantages of the present invention will become apparent from a further reading of the description and of the appended claims.

With the above, and other objects in view, the present invention comprises in an open hearth smelter, in combination, a furnace chamber adapted to hold material to be smelted, first means for projecting at a relatively high speed at least one jet of a fuel adapted to create, during combustion, a relatively high temperature against the material to be smelted in the furnace chamber, avoiding by the high speed of the fuel jet deflection of the same thereby preventing the walls of the furnace chamber from being adversely affected by the high temperature of the fuel jet, and second means for projecting at a relatively low speed at least one jet of a fuel adapted to create, during combustion, a relatively low elevated temperature against the material to be smelted in the furnace chamber after the same has been first molten by the high-speed, high-temperature fuel jet, permitting due to the low speed of the fuel jet deflection of the same thereby increasing the total length of the jet so as to obtain a substantially equal effect of the low-speed, low-temperature fuel jet along the entire surface of the material.

According to a preferred embodiment of the present invention, the open hearth smelter comprises, in combination, a furnace chamber having a pair of substantially parallel opposite end walls and adapted to hold material to be smelted, means for introducing hot oxygen-containing gas into the furnace chamber, a jacketed fuel container adapted to contain a fluid fuel and adapted to be cooled by introduction of a cooling fluid into the jacket of the container, located adjacent to at least one of the parallel opposite end walls of the furnace chamber, a plurality of nozzle burner means cross-secting the jacket of the fuel container and the end wall of the furnace chamber so as to communicate with the fuel container and the furnace chamber for projecting at a relatively high speed a plurality of jets of a fluid fuel adapted to create during combustion a relatively high temperature, from the gas container means against the material to be smelted in the furnace chamber, avoiding by the high speed of the fuel jets deflection of the flame formed by combustion of the same with the oxygen-containing gas in the furnace chamber, thereby preventing the walls of the furnace chamber fbrom being adversely affected by the high temperature of the flame, said nozzle burner means being arranged spaced from a vertical plane bisecting the end wall into substantially equal halves, and second burner means for projecting at a relatively low speed at least one jet of fuel adapted to create during combustion a flame having a relatively low elevated temperature, against the material to be smelted in the furnace chamber after the same has been first molten by the flame formed by the high-speed, high-temperature fuel jets, permitting, due to the low speed of the fuel jet, deflection of the flame formed by combustion of the same, thereby increasing the total length of the flame so as to obtain a substantially equal effect of the low-speed, low-temperature fuel jet flame along the entire surface of the material, the second burner means being downwardly inclined and located nearer to the vertical plane than the nozzle burner means.

According to the present invention, it is also contemplated to provide cleaning means for cleaning the nozzles through which the high speed fuel jet is introduced into the furnace chamber and, if desired, also cleaning means for cleaning the burner means through which the low speed fuel jet passes. These cleaning means preferably comprise an elongated reciprocative member having a forward portion adapted to be inserted into the nozzle so that the nozzle will be cleaned by reciprocating movement of the forward portion of the elongated member. In order to improve cleaning action, the elongated member may be rotatable and may be formed with cutting elements at its forward portion which is to be inserted into the nozzle. Since the elongated cleaning member is advantageously so arranged as to cross-sect the fuel container, the rearward portion of the elongated cleaning member preferably includes a plug which will close the opening in the rearward wall of the fuel container through which the elongated cleaning member passes, when the same is in an inoperative position.

The present invention also contemplates means for selectively covering the nozzle openings facing into the furnace chamber so as to control through which of the nozzle openings a fuel jet is to pass into the furnace chamber. These control means are preferably formed of pipes through which a cooling fluid passes as will be more fully described further below, serve also for keeping the unused nozzles clean.

The present invention also contemplates in a steel smelting method wherein a mass of solid steel forming material is subjected in an open hearth furnace to flames so as to be transformed into molten steel, the steps of directing in an open hearth furnace at least one short, hot flame under pressure against a solid steel forming mass so as to contact said mass with said short, hot flame, the pressure being sufficiently high to substantially prevent deflection of the hot flame upon contact with the mass so as to prevent substantially contact between said hot flame and the inner wall of the open hearth furnace, and the temperature of the hot flame being sufficiently high to quickly melt the mass, so as to substantially melt the solid mass, and subjecting the thus substantially molten mass to a long low pressure flame having a temperature considerably lower than the temperature of the short flame but higher than the melting point of steel, for a period of time sufficient to complete conversion of the mass into molten steel.

Preferably, the over pressure with which the short hot flame is directed against the steel forming mass is equal to between about one and 4 atmospheres and the over pressure of the long low pressure flame is equal to between about 0.1 and 0.6 atmosphere.

Thus, according to the present invention, a high pressure gaseous fuel is blown in the form of a multitude of fine jets into the hot air stream in the furnace chamber so that a short and very hot flame is produced during the melting down of the steel forming material. Once the material has been melted down, low pressure fuel is blown in a continuous stream into the hot air stream so that a long flame of lower temperature is produced. This long low temperature flame can also be formed with conventional oil burners, i.e., with liquid rather than gaseous fuel.

While it could be expected that the short and very hot flame which is produced for the melting down of the material, would attack the inner lining of the furnace chamber walls, in fact, would attack the same even more than a long drawn out flame, such attack on the furnace walls does not occur according to the present invention.

Actually, a long flame does not pass unhampered over the still unmolten material such as scrap, etc. The flame is divided and deflected when attacking the unmolten material and thus changes its direction so as to contact the side walls and the roof of the furnace chamber. This causes the deterioration of the furnace wall portions coming in contact with the flame, requiring frequent repairs and thus shut downs of the furnace.

Combustion of the high pressure gas along a much shorter path than the path of the long low pressure flame, results in a considerably increased flame temperature and thus in an improvement of the heat transfer upon contact of the high temperature flame and the scrap or other material to be melted. The heat transfer is further improved according to the present invention due to the fact that the high temperature flame, while being shorter, possesses a considerably increased cross-sectional area which comes in contact with the material to be melted.

Due to the high speed of flow of the gases forming the short hot flame, deflection of the tips of the flame towards the side wall or the roof of the furnace chamber is avoided. By properly adjusting the direction of the individual gas nozzles, such deflection onto the refractory brick work can be completely eliminated. It has been found that thereby a three-fold increase in the useful life span of the inner lining of the furnace chamber is achieved, thus greatly reducing the required shut down periods. It is a surprising result of the method and apparatus according to the present invention that by producing a flame of higher temperature while simultaneously reducing the length of the path of the flame within the furnace chamber, the deteriorating effect of the flame with respect to the furnace chamber walls is greatly reduced.

It is also important to form for the melting down of the material a non-luminous flame so that at most only slight carburation takes place. It has been found that upon strong carburization and with a correspondingly luminous flame, radiation at the high flame temperature could again cause increased deterioration of the furnace chamber lining.

Thus, it is a particular advantage of the process and apparatus according to the present invention that deterioration of the furnace chamber lining is greatly reduced. However, in addition thereof, the present invention will result in a considerable increase in the yield and efficiency of the open hearth furnace.

While, when working with a long flame, the air covers the gas stream and will penetrate the same only slowly under a continuous combustion of the penetrated gas layers, according to the present invention, during the melting down period, contact between the gaseous fuel and the oxygen of the air is quickly accomplished along a short path so that a short and very hot flame is produced. Thereby, the melting down time is greatly reduced and the entire charge is completed in a shorter period of time than was hitherto possible. Thus, the yield of the open hearth furnace is increased and it is also possible in this manner, i.e., by incorporation of the nozzle arrangement according to the present invention, to considerably increase the yield of an existing open hearth installation. This increase in yield of an existing installation can be achieved at relatively small expense by the subsequent incorporation of the nozzle means according to the present invention, resulting in savings with respect to operational costs which should be many times greater than the expense of installation of the new nozzle means. Furthermore, such installation can be carried out in a much shorter period of time than would be required for the construction of a new open hearth furnace.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawings in which:

Figure 1:
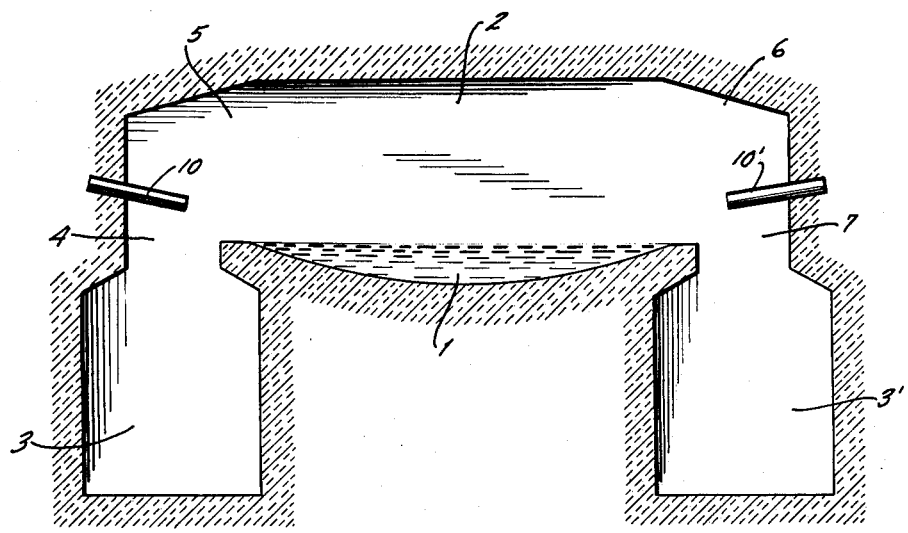
FIG. 1 is a schematic elevational view of an open hearth furnace according to the present invention.
Figure 2:
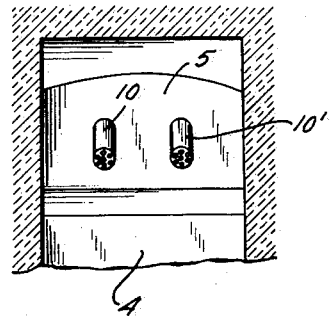
FIG. 2 is a schematical elevational view of a nozzle arrangement according to the present invention.

Referring now to the drawings, and particularly to FIG. 1, an open hearth furnace 2 is shown having a hearth portion 1 through which air is passed from regenerator chamber 3 through fantail 4. Waste gases will pass along the other portion through fantail 7 into regenerator chamber 3'. Nozzle burner arrangements 10 and 10' penetrate through the opposite end walls 5 and 6 of the port portions, as shown in more detail in FIGS. 2 and 7.

Figure 3:
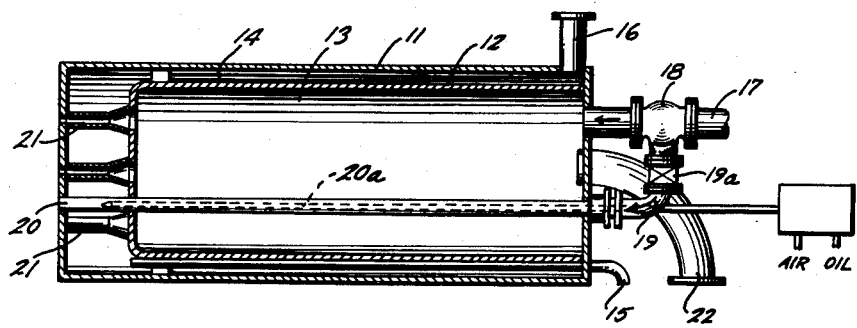
FIG. 3 is an elevational cross-sectional view through the fuel container and nozzle arrangement according to the present invention.

FIG. 3 is a view of burner 10 shown on a larger scale. In the tubular steel body 11 forming the outer wall of jacket 14, is located a cylindrical container 12 forming gas chamber 13. Cooling water passes through the jacket 14 formed by walls 11 and 12. The cooling water is introduced through conduit 15 and leaves the jacket through conduit 16. Gaseous fuel is introduced through conduit 17 in which a three-way valve 18 is located for controlling the gas stream in such a manner that the gas either passes into container 13 or through conduit 19 and pressure reduction valve 19a into nozzle tube 20. Nozzle tube 20 is located in part within gas container 13, then penetrates through the front portion of jacket 14 terminating at the front plate of the burner. A lance 20a for carrying liquid fuel such as oil, or pulverized coal, is inserted into nozzle tube 20. Lance 20a penetrates through conduit 19 and connects with a fuel source. Three-way valve 18 allows also for cutting off both conduits so that neither the burner for the long flame nor the burner for the short and hotter flame will be supplied with fuel. Oil lance 20a has a lesser diameter than nozzle tube 20 and extends forwardly into the vicinity of the front end of nozzle tube 20. The long flame can be produced by exclusively combusting oil or pulverized carbon which are supplied through oil lance 20a which may be attached to a spraying and mixing device. The nozzles which are used for producing the short hot flames are indicated by reference numeral 21. As can be seen, preferably a plurality of such nozzles 21 is provided. At the rear wall of the burner device, a short piece of pipe 22 is provided. In accordance with applicable safety regulations, the open end of pipe 22 is tightly covered with a metal foil which will burst in case of explosion or development of undue excess pressure within gas container 13.

Figure 4:
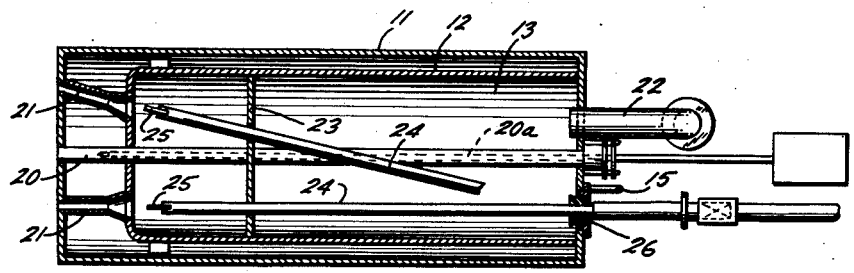
FIG. 4 is a plane cross-sectional view through the fuel container and nozzle arrangement according to the present invention.
Figure 5:
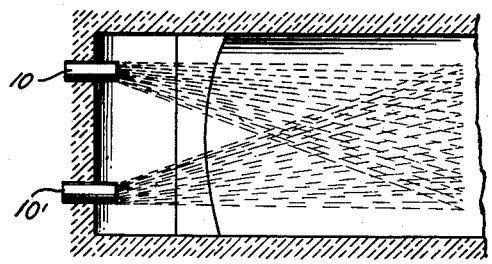
FIG. 5 is a schematic horizontal illustration of the adjustment of the fuel jet and the flame by the nozzle means according to the present invention.

In order to effectively form a short flame of large cross-section in furnace chamber 2, particularly directed towards the bath portion 1 thereof, it is desirable to arrange individual nozzles 21 so that their axes cross-sect each other, as shown in FIG. 4. Thereby, it is possible to form the flame cones, for instance, as illustrated in FIG. 5.

The burner arrangement illustrated in FIG. 4 corresponds substantially to the arrangement shown in FIG. 3. A cooling jacket is formed by the walls 11 and 12, wall 12 defining the gas container 13. Nozzle tubes 20 and 21, as well as safety device 22, are similar to what is also shown in FIG. 3. Only conduit 15 for introduction of cooling water is visible in FIG. 4. Fig. 4 serves primarily to illustrate the nozzle cleaning devices which are provided according to a preferred embodiment of the present invention. Within gas chamber 13, a grate-like support 23 is installed serving as guide for elongated cleaning members 24 which may be provided at their front end portion with specific cleaning tools 25 such as wire brushes, augers, drills, reamers or other, preferably cutting, tools. Elongated cleaning members 24 are giuded through openings 26 in the rear wall of gas container 13 and may be provided with suitable means for rotating members 24 about their axes. Preferably, the driving means for rotating members 24 comprise a flexible shaft so as to allow for a slight angular movement of members 24 in order to more strongly contact the inner face of the respective nozzle which is to be cleaned. It is also possible to form members 24 as tubular members so that compressed air or the like may be introduced into the hollow interior of tubular member 24 and may pass through an opening in the front end thereof in order to assist in the cleaning of the nozzle. Elongated members 24 can also be so shaped at their front end that the same may serve as plugs for closing the selected nozzle openings during operation of the remainder of the burner device.

Figure 6:
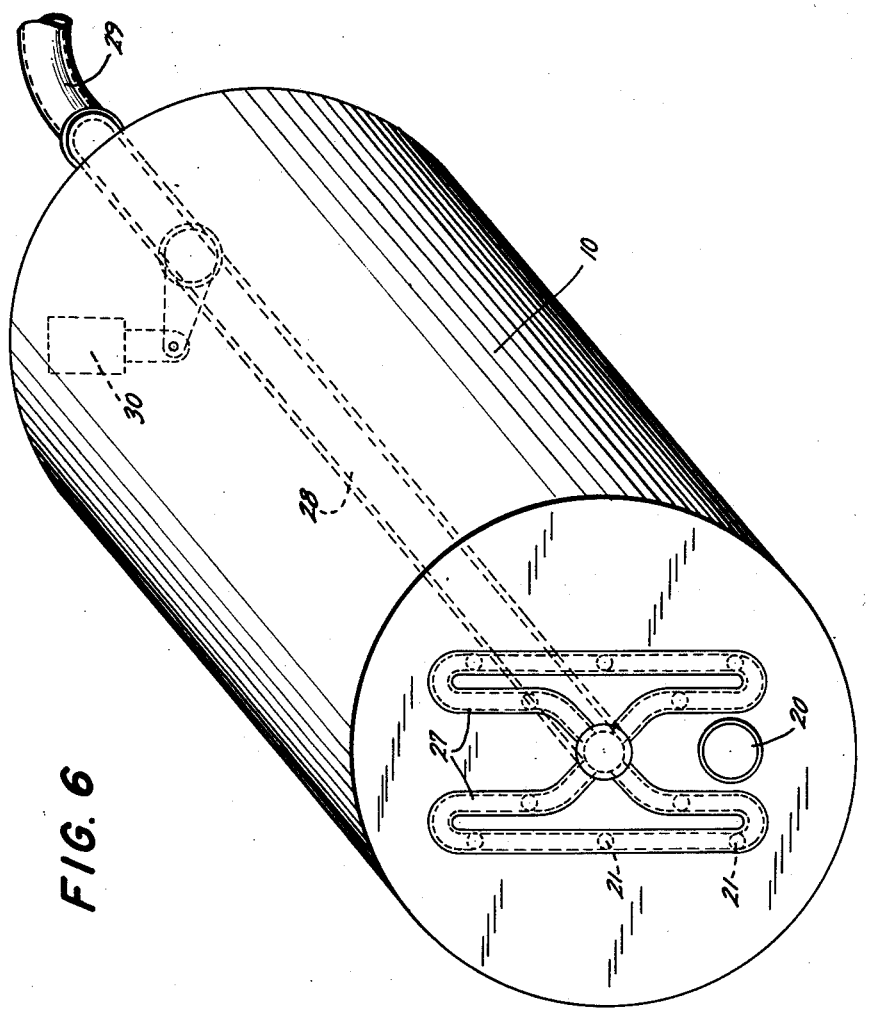
FIG. 6 is a schematic perspective view of the fuel container, and particularly of the means for covering selected nozzle openings.

It is also within the scope of the present invention to provide a special cover means for selectively covering and thus protecting one or more of the individual nozzle means. This is shown in FIG. 6. The cover means 27 consisting of a tubular communicating structure is turnably attached to a tubular axis 28 extending throughout the entire burner means 10. The tubular axis 28 is adapted in conventional manner to rotate, thereby also rotating cover means 27. Tubular axis 28 and tubular cover means 27 communicate with each other so that a cooling fluid can be introduced into cover means 27 through conduit 29 communicating with tubular axis 28. Nozzle opening 20 for producing the long flame of relatively low temperature, as well as nozzle openings 21 for producing the short high temperature flame, are illustrated in order to show how nozzles 21 are covered and protected against dirt while the long flame of relatively low temperature is produced by nozzle 20. Turning of tubular axis 28 can be accomplished, for instance, with a hydraulic piston driving means 30.

Figure 7:
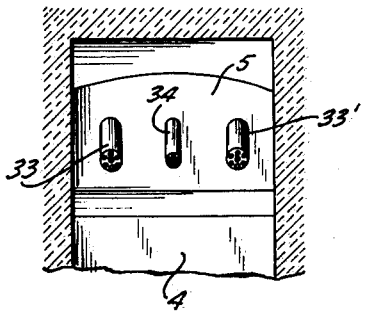
FIG. 7 is a schematical elevational view of another nozzle arrangement according to the present invention.

As shown in FIG. 7, it is also possible, according to the present invention, to completely separate the nozzle burner means 33 and 33' which serve for producing the short hot flame from nozzle 34 corresponding to nozzle 20 of FIGS. 3 and 4, i.e., serving for producing the long flame of relatively low temperature.

The arrangement shown in FIG. 7 has the further advantage that the construction of the entire burner arrangement is simplified by separating the same into two distinct arrangements for producing hot flames and one separate arrangement for producing the long flame of relatively low temperature. Cooling, cleaning and covering devices can be arranged in connection with the embodiment of the present invention illustrated in FIG. 7, substantially in the same manner as illustrated in FIGS. 3, 4 and 6.

Thus, as has been illustrated, the furnace port is preferably provided, according to the present invention, with at least one burner arrangement including a jacketed fuel container into which gaseous fuel is introduced from a compressor or high pressure fuel conduit, and which carries a plurality of relatively small nozzles through which individual gas streams of small diameter and under considerable pressure, preferably between 1 and 4 atmospheres over pressure, can be blown into the hot air of the furnace chamber. Furthermore, at least one low pressure burner for gas, oil, or pulverized carbon is located in the vicinity of the high pressure nozzle arrangement. It is frequently advantageous to surround the high pressure and low pressure burners jointly in a cooling jacket.

When two groups of pressure nozzle burners are used which are arranged within the same horizontal plane, spaced from each other, it is possible by varying the longitudinal direction of individual nozzles to form gas jets which cross-sect each other in the furnace chamber so as to produce a sheet of flame of relatively large cross-section. This is preferably achieved by arranging two high pressure burners located in one horizontal plane, on both sides of, and equidistant from the longitudinal axis of the furnace chamber, and directing the outermost nozzle of each burner parallel to the furnace axis while inclining the nozzles which are closer to the furnace axis towards the same. In this manner, the outer nozzles will define the lateral limits of the flame, while the fan-like inwardly inclined nozzles will produce an intense high temperature flame sheet. In this manner, the melting down period is greatly reduced and the inner lining of the furnace wall and roof is protected against damage that would be caused by direct contact of the furnace lining with the hot flame sheet.

Furthermore, as illustrated and described above, it is preferred to provide, according to the present invention, a cooling jacket, surrounding the gas container which serves for distributing combustion gas to the individual nozzle burner arrangement, and whereby the nozzles are located within, i.e., surrounded by, the cooling jacket.

Conventionally, the nozzles of open hearth furnaces are cleaned with hooks introduced through a side opening in the furnace. This has been found to be a rather unsatisfactory procedure because it is complicated to carry out and does not permit satisfactory cleaning of the nozzles. Such conventional cleaning arrangement would be particularly unsatisfactory in connection with the nozzle burner arrangement according to the present invention since the individual nozzle openings are relatively small. It is, therefore, further proposed, according to the present invention, to clean the nozzles, as has been described further above, by means of elongated cleaning members which are introduced into the nozzles from their ends opposite to the furnace chamber. The elongated cleaning members which penetrate through the gas distributing container, are preferably formed with plugs which allow closing of the opening in the gas container wall through which the elongated member is introduced into the same. It is also within the scope of the present invention to provide plug-like portions to be attached to the free forward end of the elongated cleaning member, and which can serve to close individual nozzles which, for some reason, should remain inactive during operation of the nozzle arrangement.

According to a preferred embodiment of the present invention, the elongated cleaning members are formed of tubes which are cut off under an angle to their axes so that eliptic cutting edges are formed at the free forward ends of the cleaning members. These cutting edges may be ground in order to improve the cutting and thereby the cleaning action when the elongated member is introduced into a nozzle.

The present invention has been illustrated with the nozzle arrangements located in the end walls or port portions of the furnace chamber. However, it is also within the scope of the present invention to arrange the burners perpendicular to the furnace axis above fantails 4 and 7.

From the foregoing, it will be understood that the solid material in the furnace upon being melted down will form a substantially horizontal upper level over which the long, luminous relatively low temperature flame can easily pass without being subject to considerable deflection.

Generally, the temperature of the short hot flame, according to the present invention, should be approximately between 2,150 and 2,300° C., and the temperature of the luminous less hot flame between 1,850 and 2,000° C. Preferably, air and fuel are so adjusted that the short hot flame possesses an excess free oxygen content of between 2 and 3%, and the long luminous flame possesses an excess oxygen content of between 2 and 3%.

The following examples are given as illustrative only of the method of the present invention, the invention, however, not being limited to the specific details of the examples:

Example I

An open hearth furnace having a capacity of 100 tons and using about 3,000 cubic meters of gas was operated according to the present invention with a charge consisting of:

20 tons steel makers' pig iron (stahleisen)
20 tons faggotted iron
7 tons chips
53 tons commercial scrap of varying quality.

The charging time was 3 hours, the melting down time 2½ hours, of which the first 1½ hours were operated with the short hot flame and the remaining hour with the long luminous flame. The subsequent working period lasted 1¾ hours so that the total time required for the heat was 7¼ hours.

The same furnace operating with a similar charge in conventional manner required for the charging 4 hours, the melting down 4 hours, and the subsequent working period 2½ hours so that the total time required amounted to 10¼ hours. Thus, the productive capacity of the open hearth furnace is greatly increased according to the present invention. The average yield in the conventionally operated furnace amounted to 8½ tons per hour, and in a basic open hearth process, it was necessary to reline the furnace after 450 heats.

After conversion of the furnace according to the present invention, the average hourly production rose to 11 tons and the furnace could withstand 1,000 heats.

Example II

An acid open hearth having a hearth area of 36 square meters and operating with charges of 90 tons showed, during conventional operation, an average productive capacity of 7½ tons per hour, however, the acid lining could withstand only 90 heats.

Upon conversion of the furnace according to the present invention, the average hourly capacity rose to 10 tons and the furnace could withstand 350 heats before being shut down for repair of the acid lining.

In both cases, the charge consisted of:

28% Stahleisen
15% rolling scrap from own mill, and the balance commercial scrap (i.e. scrap of relatively low and varying quality).

The product obtained according to the present process was of structural steel quality.

Example III

A smaller open hearth furnace having an area of 17½ square meters and operating with a charge of 30 tons was capable of yielding in conventional operation 4.05 tons per hour and the furnace lining withstood 160 heats.

After installation of the burner arrangement according to the present invention and operation of the furnace as described above, the hourly yield increased to an average of 4.55 tons per hour and the furnace lining withstood between 380 and 450 heats. In this case, the charge consisted of:

27% Stahleisen
20% scrap from own operation, and the balance commercial scrap.

Casting steel, tube forming steel and forging steel was produced.

As has been described above, prior efforts to increase the capacity of open hearth furnaces by increasing the flame temperature were unsuccessful since the conventional luminous flames caused excessive wear of the furnace lining inasmuch as the intensive radiation resulted not only in heating of the material, but also excessive heating of the furnace walls.

Surprisingly, it was found, according to the present invention, that by means of non-luminous short flames directed against the material to be melted, a highly intensive heat transfer could be achieved. Utilizing these finding, a nozzle arrangement for open hearth furnaces is proposed to the present invention which will permit the melting of material with a non-luminous or only slightly luminous but very hot flame and to work the thus formed melted mass with a less hot but longer and luminous flame.

The long luminous flame can be produced with a conventional oil burner. The short hot flame, however, is produced by passing the gaseous fuel to a plurality of nozzles located preferably in each of the two ports of the furnace, whereby in each of the nozzles again the gas stream is subdivided into several individual streams of small diameter so that a plurality of small high pressure jets of gaseous fuel enter the furnace from these nozzles. Furthermore, the direction of the nozzles is preferably arranged in such a manner that the individual small gas jets are angularly disposed against each other producing a fan-like flame sheet.

Thereby, an intensive mixing effect of gaseous fuel and combustion air takes place and consequently very quick combustion resulting in a hotter flame which, due to its larger cross-section and due to its greater speed of flow, possesses very considerable stability against deflection upon contacting the scrap pile in the furnace. By thus reducing or preventing deflection, contact between the hot flame and the furnace lining is substantially eliminated.

In this manner, according to the present invention, the time required per heat is considerably reduced, the furnace can be charged more quickly and more voluminous scrap can be worked up without reduction of hourly yield. The entire melting time and, to some extent, the working time can be reduced. Simultaneously, the advantage is achieved that a considerably greater number of heats can be completed before the furnace has to be shut down for repair of its lining.

It will be understood that each of the elements described above, or two or more together, may also find a useful application in other types of smelting devices differing from the types described above.

While the invention has been illustrated and described as embodied in an open hearth furnace, it is not intended to be limited to the details shown, since various modifications and structural changes may be made without departing in any way from the spirit of the present invention.

Without further analysis, the foregoing will so fully reveal the gist of the present invention that others can by applying current knowledge readily adapt it for various applications without omitting features that, from the standpoint of prior art, fairly constitute essential characteristics of the generic or specific aspects of this invention and, therefore, such adaptations should and are intended to be comprehended within the meaning and range of equivalence of the following claims.

What is claimed as new and desired to be secured by Letters Patent is:

1. In an open hearth smelter, in combination, a furnace chamber adapted to hold material to be smelted; first means for projecting at a relatively high speed against said material to be smelted in said furnace chamber a plurality of fuel streams each of which consists of a multitude of fuel jets which diverge in a fan like manner and are adapted to create, during combustion, a relatively high temperature, avoiding by the high speed of said fuel jets deflection of the flame formed by combustion of the same so as to form a flame contacting a major surface area of said material to be smelted and simultaneously preventing the walls of the furnace chamber from being adversely affected by the high temperature of said flame and covering due to the fan like divergence of said fuel jets of said fuel streams the material to be smelted with an intense high temperature flame sheet; and second means for projecting at a relatively low speed at least one jet of a fuel adapted to create, during combustion, a flame of relatively low elevated temperature against said material to be smelted in said furnace chamber after the same has been first molten by the flame formed by said high-speed, high-temperature fuel jets, permitting due to the low speed of said fuel jet deflection of the flame formed by combustion of the same thereby increasing the total length of said flame so as to obtain a substantially equal effect of said low-speed, low-temperature fuel jet along the entire surface of the material.

2. In an open hearth smelter, in combination, a furnace chamber adapted to hold material to be smelted; means for introducing hot air into said furnace chamber; first nozzle means for projecting at a relatively high speed against said material to be smelted in said furnace chamber, a plurality of fuel streams each of which consists of a multitude of fuel jets which diverge in a fan like manner and are adapted to create, during combustion, a relatively high temperature, avoiding by the high speed of said fuel jets deflection of the flame formed by combustion of the same so as to form a flame contacting a major surface area of said material to be smelted and simultaneously preventing the walls of the furnace chamber from being adversely affected by the high temperature of said flame and covering due to the fan like divergence of said fuel jets of said fuel streams the material to be smelted with an intense high temperature flame sheet; and second means for projecting at a relatively low speed at least one jet of a fluid fuel adapted to create, during combustion, a flame of relatively low elevated temperature against said material to be smelted in said furnace chamber after the same has been first molten by the flame formed by said high-speed, high-temperature fuel jets, permitting due to the low speed of said fuel jet deflection of the flame formed by combustion of the same thereby increasing the total length of said flame so as to obtain a substantially equal effect of said low-speed, low-temperature fuel jet along the entire surface of the material.

3. In an open hearth smelter, in combination, a furnace chamber adapted to hold material to be smelted; means for introducing hot air into said furnace chamber; first gas burner nozzle means for projecting at a relatively high speed against said material to be smelted in said furnace chamber a plurality of converging fuel streams each of which consists of a multitude of fuel jets which diverge in a fan like manner and are adapted to create, during combustion, a relatively high temperature, avoiding by the high speed of said fuel jets deflection of the flame formed by combustion of the same so as to form a flame contacting a major surface area of said material to be smelted and simultaneously preventing the walls of the furnace chamber from being adversely affected by the high temperature of said flame and covering due to the fan like divergence of said fuel jets of said fuel streams the material to be smelted with an intense high temperature flame sheet; second oil burner means for projecting at a relatively low speed at least one jet of a fluid fuel adapted to create, during combustion, a flame of relatively low elevated temperature against said material to be smelted in said furnace chamber after the same has been first molten by the flame formed by said high-speed, high-temperature fuel jets, permitting due to the low speed of said fuel jet deflection of the flame formed by combustion of the same thereby increasing the total length of said flame so as to obtain a substantially equal effect of said low-speed, low-temperature fuel jet along the entire surface of the material; and a cooling jacket at least partially surrounding said first and second burner means.

4. In an open hearth smelter, in combination, a furnace chamber adapted to hold material to be smelted; means for introducing hot air into said furnace chamber; a jacketed gas container means adjacent to said furnace chamber, adapted to contain gaseous fuel and adapted to be cooled by introduction of a cooling fluid into said jacket thereof; a plurality of nozzle burner means communicating with said furnace chamber and said gas container means for projecting at a relatively high speed from said gas container means against said material to be smelted in said furnace chamber a plurality of fuel streams each of which consists of a multitude of fuel jets which diverge in a fan like manner and are adapted to create, during combustion, a relatively high temperature, avoiding by the high speed of said fuel jets deflection of the flame formed by combustion of the same with the hot air introduced into said furnace chamber so as to form a flame contacting a major surface area of said material to be smelted and simultaneously preventing the walls of said furnace chamber from being adversely affected by the high temperature of said flame and covering due to the fan like divergence of said fuel jets of said fuel streams the material to be smelted with an intense high temperature flame sheet; and second oil burner means for projecting at a relatively low speed at least one jet of a fuel adapted to create, during combustion a flame of relatively low elevated temperature against said material to be smelted in said furnace chamber after the same has been first molten by the flame formed by said high-speed, high-temperature fuel jets, permitting due to the low speed of said fuel jet deflection of the flame formed by combustion of the same thereby increasing the total length of said jet so as to obtain a substantially equal effect of said low-speed, low-temperature fuel jet along the entire surface of the material.

5. In an open hearth smelter, in combination, a furnace chamber adapted to hold material to be smelted; means for introducing hot air into said furnace chamber; a jacketed gas container means adjacent to said furnace chamber, adapted to contain gaseous fuel and adapted to be cooled by introduction of a cooling fluid into said jacket thereof; a plurality of nozzle burner means crosssecting said jacket and communicating with said furnace chamber and said gas container means for projecting at a relatively high speed from said gas container means against said material to be smelted in said furnace chamber a plurality of fuel streams each of which consists of a multitude of fuel jets which diverge in a fan like manner and are adapted to create, during combustion, a relatively high temperature, avoiding by the high speed of said fuel jets deflection of the flame formed by combustion of the same with the hot air introduced into said furnace chamber so as to form a flame contacting a major surface area of said material to be smelted and simultaneously preventing the walls of said furnace chamber from being adversely affected by the high temperature of said flame and covering due to the fan like divergence of said fuel jets of said fuel streams the material to be smelted with an intense high temperature flame sheet; and second oil burner means for projecting at a relatively low speed at least one jet of a fuel adapted to create, during combustion a flame of relatively low elevated temperature against said material to be smelted in said furnace chamber after the same has been first molten by the flame formed by said high-speed, high-temperature fuel jets, permitting due to the low speed of said fuel jet deflection of the flame formed by combustion of the same thereby increasing the total length of said jet so as to obtain a substantially equal effect of said low-speed, low-temperature fuel jet along the entire surface of the material.

6. In an open hearth smelter, in combination, a furnace chamber adapted to hold material to be smelted; means for introducing hot air into said furnace chamber; a jacketed gas container means adjacent to said furnace chamber, adapted to contain gaseous fuel and adapted to be cooled by introduction of a cooling fluid into said jacket thereof; a plurality of nozzle burner means communicating with said furnace chamber and said gas container means for projecting at a relatively high speed from said gas container means against said material to be smelted in said furnace chamber a plurality of fuel streams each of which consists of a multitude of fuel jets which diverge in a fan like manner and are adapted to create, during combustion, a relatively high temperature, avoiding by the high speed of said fuel jets deflection of the flame formed by combustion of the same with the hot air introduced into said furnace chamber so as to form a flame contacting a major surface area of said material to be smelted and simultaneously preventing the walls of said furnace chamber from being adversely affected by the high temperature of said flame and covering due to the fan like divergence of said fuel jets of said fuel streams the material to be smelted with an intense high temperature flame sheet; second oil burner means for projecting at a relatively low speed at least one jet of a fuel adapted to create, during combustion a flame of relatively low elevated temperature against said material to be smelted in said furnace chamber after the same has been first molten by the flame formed by said high-speed, high temperature fuel jets, permitting due to the low speed of said fuel jet deflection of the flame formed by combustion of the same thereby increasing the total length of said jet so as to obtain a substantially equal effect of said low-speed, low-temperature fuel jet along the entire surface of the material; and cleaning means including an elongated reciprocating forward portion adapted to be inserted into said nozzles, respectively, of said nozzle burner means for cleaning the same by reciprocating movement therein.

7. In an open hearth smelter, in combination a furnace chamber adapted to hold material to be smelted; means for introducing hot air into said furnace chamber; a jacketed gas container means adjacent to said furnace chamber, adapted to contain gaseous fuel and adapted to be cooled by introduction of a cooling fluid into said jacket thereof; a plurality of nozzle burner means communicating with said furnace chamber and said gas container means for projecting at a relatively high speed from said gas container means against said material to be smelted in said furnace chamber a plurality of fuel streams each of which consists of a multitude of fuel jets which diverge in a fan like manner and are adapted to create, during combustion, a relatively high temperature, avoiding by the high speed of said fuel jets deflection of the flame formed by combustion of the same with the hot air introduced into said furnace chamber so as to form a flame contacting a major surface area of said material to be smelted and simultaneously preventing the walls of said furnace chamber from being adversely affected by the high temperature of said flame and covering due to the fan like divergence of said fuel jets of said fuel streams the material to be smelted with an intense high temperature flame sheet, second oil burner means for projecting at a relatively low speed at least one jet of a fuel adapted to create, during combustion, a flame of relatively low elevated temperature against said material to be smelted in said furnace chamber after the same has been first molten by the flame formed by said high-speed, high-temperature fuel jets, permitting due to the low speed of said fuel jet deflection of the flame formed by combustion of the same thereby increasing the total length of said jet so as to obtain a substantially equal effect of said low-speed, low-temperature fuel jet along the entire surface of the material; and cleaning means including an elongated and rotatable reciprocating forward portion formed with cutting elements adapted to be inserted into said nozzles, respectively, of said nozzle burner means for cleaning the same by reciprocating and rotating movement therein.

8. In an open hearth smelter, in combination, a furnace chamber adapted to hold material to be smelted; means for introducing hot air into said furnace chamber including a nozzle-carrying front wall and a rear wall formed with at least one opening therethrough; a jacketed gas container means adjacent to said furnace chamber, adapted to contain gaseous fuel and adapted to be cooled by introduction of a cooling fluid into said jacket thereof; a plurality of nozzle burner means communicating with said furnace chamber and said gas container means for projecting at a relatively high speed from said gas container means against said material to be smelted in said furnace chamber a plurality of fuel streams each of which consists of a multitude of fuel jets which diverge in a fan like manner and are adapted to create, during combustion, a relatively high temperature, avoiding by the high speed of said fuel jets deflection of the flame formed by combustion of the same with the hot air introduced into said furnace chamber so as to form a flame contacting a major surface area of said material to be smelted and simultaneously preventing the walls of said furnace chamber from being adversely affected by the high temperature of said flame and covering due to the fan like divergence of said fuel jets of said fuel streams the material to be smelted with an intense high temperature flame sheet; second oil burner means for projecting at a relatively low speed at least one jet of a fuel adapted to create, during combustion a flame of relatively low elevated temperature against said material to be smelted in said furnace chamber after the same has been first molten by the flame formed by said high-speed, high-temperature fuel jets, permitting due to the low speed of said fuel jet deflection of the flame formed by combustion of the same thereby increasing the total length of said jet so as to obtain a substantially equal effect of said low-speed, low-temperature fuel jet along the entire surface of the material; and cleaning means including an elongated reciprocating forward portion located in said gas container means adapted to be inserted into said nozzles, respectively, of said nozzle burner means for cleaning the same by reciprocating movement therein, said cleaning means also including an elongated reciprocating rearward portion integral with said forward portion thereof and extending outwardly through said opening in said rear wall of said gas container means.

9. In an open hearth smelter, in combination, a furnace chamber adapted to hold material to be smelted; means for introducing hot air into said furnace chamber including a nozzle-carrying front wall and a rear wall formed with at least one opening therethrough; a jacketed gas container means adjacent to said furnace chamber, adapted to contain gaseous fuel and adapted to be cooled by introduction of a cooling fluid into said jacket thereof; a plurality of nozzle burner means communicating with said furnace chamber and said gas container means for projecting at a relatively high speed from said gas container means against said material to be smelted in said furnace chamber a plurality of fuel streams each of which consists of a multitude of fuel jets which diverge in a fan like manner and are adapted to create, during combustion, a relatively high temperature, avoiding by the high speed of said fuel jets deflection of the flame formed by combustion of the same with the hot air introduced into said furnace chamber so as to form a flame contacting a major surface area of said material to be smelted and simultaneously preventing the walls of said furnace chamber from being adversely affected by the high temperature of said flame and covering due to the fan like divergence of said fuel jets of said fuel streams the material to be smelted with an intense high temperature flame sheet; second oil burner means for projecting at a relatively low speed at least one jet of a fuel adapted to create, during combustion, a flame of relatively low elevated temperature against said material to be smelted in said furnace chamber after the same has been first molten by the flame formed by said high-speed, high-temperature fuel jets, permitting due to the low speed of said fuel jet deflection of the flame formed by combustion of the same thereby increasing the total length of said jet so as to obtain a substantially equal effect of said low-speed, low-temperature fuel jet along the entire surface of the material; and cleaning means including an elongated reciprocating forward portion located in said gas container means adapted to be inserted into said nozzles, respectively, of said nozzle burner means for cleaning the same by reciprocating movement therein, said cleaning means also including an elongated reciprocating rearward portion integral with said forward portion thereof and extending outwardly through said opening in said rear wall of said gas container means, said rearward portion of said cleaning means including plug means for closing said opening in said rear wall of said gas container means when said cleaning means is in inoperative position.

10. An open hearth smelter, comprising, in combination, a furnace chamber having a pair of substantially parallel opposite end walls and adapted to hold material to be smelted; means for introducing hot oxygen-containing gas into said furnace chamber; a jacketed fuel container adapted to contain a gaseous fuel and adapted to be cooled by introduction of a cooling fluid into the jacket of said container, located adjacent to at least one of said parallel opposite end walls of said furnce chamber; a plurality of nozzle burner means cross-secting the jacket of said fuel container and said end wall of said furnace chamber so as to communicate with said fuel container and said furnace chamber for projecting at a relatively high speed from said gas container means against said material to be smelted in said furnace chamber a plurality of fuel streams each of which consists of a multitude of fuel jets which diverge in a fan like manner and are adapted to create, during combustion, a relatively high temperature, avoiding by the high speed of said fuel jets deflection of the flame formed by combustion of the same with the oxygen-containing gas in said furnace chamber so as to form a flame contacting a major surface area of said material to be smelted and simultaneously preventing the walls of said furnace chamber from being adversely affected by the high temperature of said flame and covering due to the fan like divergence of said fuel jets of said fuel streams the material to be smelted with an intense high temperature flame sheet, said nozzle burner means being arranged spaced from a vertical plane bisecting said end wall into substantially equal halves; and second oil burner means for projecting at a relatively low speed at least one jet of fuel adapted to create during combustion a flame having a relatively low elevated temperature against said material to be smelted in said furnace chamber after the same has been first molten by the flame formed by said high-speed, high temperature fuel jets, permitting due to the low speed of said fuel jet, deflection of the flame formed by combustion of the same, thereby increasing the total length of said flame so as to obtain a substantially equal effect of said low-speed, low-temperature fuel jet flame along the entire surface of the material, said second burner means being downwardly inclined and located nearer to said vertical plane than said nozzle burner means.

References Cited in the file of this patent
UNITED STATES PATENTS

| | | |
|---|---|---|
| 1,833,321 | Davis | Nov. 24, 1931 |
| 1,868,666 | Langer | July 26, 1932 |
| 1,955,589 | Leahy | Apr. 17, 1934 |
| 2,256,271 | Ambrose | Sept. 16, 1941 |
| 2,362,085 | Mogan | Nov. 7, 1944 |
| 2,402,152 | Drzewiecki | June 18, 1946 |
| 2,417,951 | Schwartz | Mar. 25, 1947 |
| 2,491,705 | Bloom | Dec. 20, 1949 |
| 2,550,848 | Moody | May 1, 1951 |
| 2,669,511 | Whitney | Feb. 16, 1954 |
| 2,992,175 | De Villiers | Jan. 26, 1960 |

FOREIGN PATENTS

| | | |
|---|---|---|
| 1,166,807 | France | June 30, 1958 |